(12) United States Patent
Stober et al.

(10) Patent No.: US 12,180,994 B2
(45) Date of Patent: Dec. 31, 2024

(54) TORQUE TRANSMITTING SYSTEM WITH CONCENTRICALLY ARRANGED ROLLING BEARINGS, DRIVE UNIT, AND DRIVE ASSEMBLY

(71) Applicant: Schaeffler Technologies AG & Co. KG, Herzogenaurach (DE)

(72) Inventors: Benjamin Stober, Forstfeld (FR); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 359 days.

(21) Appl. No.: 17/641,513

(22) PCT Filed: Aug. 26, 2020

(86) PCT No.: PCT/DE2020/100751
§ 371 (c)(1),
(2) Date: Mar. 9, 2022

(87) PCT Pub. No.: WO2021/047728
PCT Pub. Date: Mar. 18, 2021

(65) Prior Publication Data
US 2022/0333641 A1     Oct. 20, 2022

(30) Foreign Application Priority Data

Sep. 10, 2019   (DE) .......................... 102019124254.1

(51) Int. Cl.
*F16C 19/56*     (2006.01)
*B60K 6/405*     (2007.10)
(Continued)

(52) U.S. Cl.
CPC .............. *F16C 19/56* (2013.01); *B60K 6/405* (2013.01); *F16C 2326/06* (2013.01)

(58) Field of Classification Search
CPC ......... B60K 6/405; B60K 6/442; F16D 1/101; F16D 2001/103; F16C 18/56; F16C 18/364; F16C 2326/06
See application file for complete search history.

(56) References Cited

U.S. PATENT DOCUMENTS 877,835 A     1/1908   Daniel
2,488,929 A * 11/1949  Palumbo ................. F16C 19/50
                                                       384/461
(Continued)

FOREIGN PATENT DOCUMENTS

CA     3097996 A1 * 11/2019 ........... F03D 1/0658
CN     101112760 A    1/2008
(Continued)

OTHER PUBLICATIONS

Twin Drive—A Step Towards Electromobility, 24 pages, VDI-FVT Yearbook 2009.

*Primary Examiner* — Tinh Dang
(74) *Attorney, Agent, or Firm* — Volpe Koenig

(57) ABSTRACT

A torque transmitting system, a drive unit, and a drive assembly are provided. The torque transmitting system includes a torque transmitting element and a support element which supports it via rotary bearings. The torque transmitting element has a first connection device for coupling to a first assembly in a rotationally fixed manner and a second connection device for coupling to a second assembly. One of the two elements forms a substantially hollow cylindrical shoulder, and the respective other element forms the outer cylindrical face and, correspondingly thereto, the inner face of a hollow cylinder radially outwards. The shoulder is arranged between the outer face and the inner face in a radial direction. A first rotary bearing is arranged between the outer face and the shoulder, and a second rotary bearing is (Continued)

arranged between the shoulder and the inner face. By using the torque transmitting system, less axial installation space is.

20 Claims, 2 Drawing Sheets

(51) Int. Cl.
  *B60K 6/442* (2007.10)
  *F16C 19/36* (2006.01)
  *F16D 1/10* (2006.01)

(56) References Cited

U.S. PATENT DOCUMENTS

| | | | | |
|---|---|---|---|---|
| 2,518,159 | A | * | 8/1950 | Martin ............... H02K 7/083 310/90 |
| 2,553,536 | A | | 5/1951 | Frankel |
| 2,769,674 | A | * | 11/1956 | Neuffer ............... F16C 19/55 384/461 |
| 2,789,021 | A | * | 4/1957 | Pedersen ............ F16C 33/6677 415/203 |
| 4,618,271 | A | * | 10/1986 | Li ..................... F16C 33/306 384/550 |
| 5,639,166 | A | * | 6/1997 | Dittenhofer ............ F16C 13/02 384/454 |
| 6,651,633 | B1 | * | 11/2003 | Jones .................. F02B 39/06 123/559.1 |
| 9,062,661 | B2 | * | 6/2015 | Frank ................... F03D 80/70 |
| 2004/0038770 | A1 | * | 2/2004 | Flamang ............... F03D 15/10 475/348 |
| 2005/0224264 | A1 | | 10/2005 | Perrin |

FOREIGN PATENT DOCUMENTS

| | | |
|---|---|---|
| CN | 101595299 B | 6/2012 |
| CN | 108368890 B | 1/2020 |
| CN | 108291587 B | 1/2021 |
| CN | 109070727 B | 10/2021 |
| CN | 109715967 B | 10/2021 |
| DE | 3716098 | 11/1988 |
| DE | 3828351 | 2/1990 |
| DE | 10201522690 | 5/2017 |
| DE | 102015222691 | 5/2017 |
| DE | 102015222692 | 5/2017 |
| DE | 102015222694 | 5/2017 |
| DE | 102016217822 A1 | 3/2018 |
| DE | 102017127695 | 5/2019 |
| FR | 2635563 B2 | 8/1991 |
| WO | 2008092447 | 8/2008 |
| WO | 2008092448 | 8/2008 |
| WO | 2012105299 A1 | 8/2012 |
| WO | 2015057126 | 4/2015 |
| WO | 2015057137 | 4/2015 |
| WO | 2017084888 | 5/2017 |
| WO | 2017084889 | 5/2017 |
| WO | 2019101264 | 5/2019 |
| WO | 2019105504 | 6/2019 |

* cited by examiner

TORQUE TRANSMITTING SYSTEM WITH CONCENTRICALLY ARRANGED ROLLING BEARINGS, DRIVE UNIT, AND DRIVE ASSEMBLY

CROSS-REFERENCE TO RELATED APPLICATIONS

This application is the U.S. National Phase of PCT Appln. No. PCT/DE2020/100751, filed Aug. 26, 2020, which claims priority from German Patent Application No. 10 2019 124 254.1, filed Sep. 10, 2019, the entire disclosures of which are incorporated by reference herein.

TECHNICAL FIELD

The disclosure relates to torque transmitting system, a drive unit for a drivetrain of an electrically drivable motor vehicle, in particular of a hybrid motor vehicle, as well as to a drive assembly.

BACKGROUND

Various drivetrains with drive units for electrically drivable motor vehicles and drive assemblies are known from the background of the art which include, inter alia, an internal combustion engine and at least one, in particular two, electrical machines.

DE 10 2015 222 690 A1, DE 10 2015 222 691 A1 and WO 2017 084 887 A1 describe methods for controlling such drive units, wherein the drive unit can be operated in a plurality of operating modes.

DE 10 2015 222 690 A1 mainly describes a serial hybrid operation in which the drive torque is brought about by means of the second electrical machine and the internal combustion engine drives the first electrical machine to generate electrical energy. It describes how the internal combustion engine is operated at an operating point based on a combined efficiency that depends on the efficiency of the internal combustion engine and on the efficiency of the first electrical machine.

Documents DE 10 2015 222 691 A1 and WO 2017 084 887 A1 describe a performance-oriented and a consumption-oriented mode, wherein a respective mode is dependent on a condition. This condition indicates that a target drive value is increased to an intermediate value which lies between an internal combustion engine threshold, which represents a maximum drive value in a parallel hybrid mode in which only the internal combustion engine causes a drive torque, and a parallel hybrid mode threshold, which represents a maximum drive value in the parallel boost hybrid mode.

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electrical machine coupled to the internal combustion engine, a second electrical machine, an electric battery and a main clutch between the internal combustion engine and the drive wheel.

DE 10 2015 222 692 A1 and WO 2017 084 888 A1 describe that the drive device is operated in one of three operating modes, namely in a purely electrical mode, a serial hybrid mode or a parallel hybrid mode. The drive torque provided during the switch from the first operating mode to the second operating mode corresponds to a suitably selectable profile between the drive torque provided before and after the switch.

DE 10 2015 222 694 A1 and WO 2017 084 889 A1 disclose that a transmission is also enclosed between the internal combustion engine and the drive wheel. Here, the method includes:
operating the internal combustion engine at a first speed for the first gear in a parallel hybrid mode while a first gear of the transmission is engaged;
switching to a serial hybrid mode;
disengaging the main clutch;
adjusting a speed of the internal combustion engine with the main clutch disengaged to a second speed for a second gear of the transmission in the parallel hybrid mode;
engaging the second gear of the transmission;
engaging the main clutch; and
switching to the parallel hybrid mode while the second gear is engaged.

Furthermore, an above-mentioned document describes a hybrid vehicle which can carry out a respective method.

WO 2019 105 504 A1 discloses a drive unit for a drivetrain of a hybrid motor vehicle comprising an internal combustion engine, a first electrical machine, a second electrical machine, a first transmission stage, and a drive shaft of the first electrical machine and/or the second electrical machine. Furthermore, the drive unit comprises a transmission sub-unit, via which the drive shaft of the electrical machine is coupled or can be coupled to wheel drive shafts. A second transmission stage is coupled to a layshaft unit, wherein the layshaft unit has an integrated clutch and is further connected to the wheel drive shafts such that the internal combustion engine can be coupled to the wheel drive shafts via the second transmission stage according to the position of this clutch.

WO 2019 101 264 A1 discloses a drivetrain for a hybrid motor vehicle which has a transmission input shaft which is operatively connected via a first partial drivetrain to a first electrical machine and an internal combustion engine for torque transmission and which is operatively connected via a second partial drivetrain to a second electrical machine for torque transmission. The second electrical machine is permanently connected to the transmission input shaft so as to transmit torque, and the first electrical machine and the internal combustion engine can be connected to the transmission input shaft in a couplable manner for torque transmission.

A hybrid module is also known for a motor vehicle for coupling an internal combustion engine, comprising a first drive shaft and, coupled thereto, a first electrical machine and a first clutch device. In addition, the hybrid module comprises a second drive shaft and a second electrical machine as well as a second clutch device. The hybrid module also has an output element. A corresponding drive shaft can be or is connected to the output element via a clutch device. According to the invention, the two clutch devices can be actuated simultaneously by a movement of an actuating element which is mechanically coupled to both clutch devices.

The background of the art further comprises a drive unit for a drivetrain of a hybrid motor vehicle, comprising a first electrical machine, a second electrical machine and a transmission input shaft as the output shaft, wherein a rotor of the second electrical machine is connected in a rotationally fixed manner to the output shaft. Furthermore, the drive unit has a disconnect clutch using which a rotor of the first electrical machine and thus an internal combustion engine, connected to a first shaft which is connected in a rotationally fixed manner to the rotor of the first electrical machine, can be connected or is connected to the output shaft for torque transmission. According to the invention, the rotor of one of the electrical machines is at least indirectly supported radially on the rotor of the other electrical machine by means of at least one rotary bearing.

In known drive units for a drivetrain of an electrically drivable motor vehicle, generally a torque transmitting system is provided for transmitting a torque between the internal combustion engine and at least one electrical machine.

Such a torque transmitting system is known to have a so-called ring gear as a torque transmitting element between the drive assemblies of the drivetrain with the known drive unit.

FIG. 1 shows such a torque transmitting system 10 according to the background of the art.

The torque transmitting system 10 comprises a torque transmitting element 11 and a support element 20.

The torque transmitting element 11 is configured as a so-called ring gear and, for this purpose, has a radially extending web 80. The torque transmitting element 11 has a first connection device 12 on the first axial side 81 of the web 80 and a second connection device 13 on the second axial side 82 of the web 17. The first connection device 12 is used for at least indirectly connecting the torque transmitting element 11 to an internal combustion engine and the second connection device 13 is used for at least indirectly connecting the torque transmitting element 11 to at least one electric rotary machine. In the axial direction between the second connection device 13 and the second axial side 82 of the web 80, the torque transmitting element 11 also has a tool run-out d to enable a milling or skiving tool to run out during the manufacture of the second connection device 13 configured as a toothing.

On the first axial side 81 of the web 80, the torque transmitting element 11 is supported on the support element 20 via two rotary bearings 30, 40. The support element 20 is a rotationally fixed component of a housing of a drive assembly and has an axially extending shoulder 21 and a projection 22 formed by the shoulder 21 on its radial inner face.

The first rotary bearing 30 is arranged with its inner ring 32 on the radial outer face of the portion of the torque transmitting element s11 comprising the first connection device 12 and rests in the axial direction against the first axial side 81 of the web 80. An outer ring 31 of the first rotary bearing 30 rests radially against the radial inner face of the shoulder 21 of the support element 20 and axially on the axial side of the projection 22 facing the web 80.

The second rotary bearing 40 is also arranged with its inner ring 42 on the radial outer face of the portion of the torque transmitting element 11 comprising the first connection device 12 and rests against a securing element 70 in the axial direction. An outer ring 41 of the second rotary bearing 40 rests radially against the radial inner face of the shoulder 21 of the support element 20 and axially on the axial side of the projection 22 facing away from the web 80.

The securing element 70 is designed as a nut 71 which is arranged on the radial outer face of the portion of the torque transmitting element 11 having the first connection device 12 and is screwed to this portion there for the purpose of securing the axial positions of the rotary bearings 30, 40.

By mounting the torque transmitting element 11 via the two rotary bearings 30, 40 arranged axially next to one another on the support element 20, the torque transmitting element 11 can be rotated about an axis of rotation 1 and is supported on the support element 20 in both the axial direction and the radial direction.

Due to an axially adjacent arrangement of the rotary bearings according to FIG. 1, adequate axial installation space must be provided for the torque transmitting system. For the purpose of cost-effective manufacture of the second connection device, a sufficiently long tool run-out is also to be provided, which requires further axial installation space.

SUMMARY

Based on this, the present disclosure addresses the object of providing a torque transmitting system and a drive unit equipped therewith for a drivetrain of an electrically drivable motor vehicle and a drive assembly which cost-effectively and in a structurally simple manner achieve low axial space requirements.

The object is achieved by the torque transmitting system having one or more of the features disclosed herein. Advantageous embodiments of the torque transmitting system are provided below and in the claims.

In addition, a drive unit for a drivetrain of an electrically drivable motor vehicle which has the torque transmitting system is provided.

In addition, a drive assembly having a drive unit is provided.

The features disclosed herein may be combined in any technically useful way, including the explanations from the following description and features from the figures which comprise additional embodiments of the disclosure.

In connection with the present disclosure, the terms "axial" and "radial" always refer to the axis of rotation of the torque transmitting system.

The disclosure relates to a torque transmitting system for transmitting a torque from at least one drive assembly. The torque transmitting system comprises a torque transmitting element and a support element supporting the torque transmitting element by means of rotary bearings, wherein the torque transmitting element has a first connection device, in particular a first toothing, for coupling the torque transmitting element in a rotationally fixed manner with a first assembly and a second connection device, in particular a second toothing, for coupling of the torque transmitting element in a rotationally fixed manner with a second assembly. One of the two elements of torque transmitting element and support element forms a substantially hollow cylindrical shoulder and the other element in each case forms an outer face of a cylinder and, correspondingly thereto, an inner face of a hollow cylinder radially outwards. The shoulder is arranged in the radial direction between the outer face of the cylinder and the inner face of the hollow cylinder. A first rotary bearing is arranged between the outer face of the cylinder and the shoulder, and a second rotary bearing is arranged between the shoulder and the inner face of the hollow cylinder.

The first assembly can be an internal combustion engine, for example. The second assembly can, for example, be an electric drive device that can function both as an electric motor and as an electric generator.

The torque transmitting system enables the modes of the individual assemblies to be coupled, such as, for example, an internal combustion engine mode with simultaneous generator mode of the electric drive device; or a so-called boost mode, in which the drive power of the internal combustion engine and the electric drive device operated as an electric motor are combined. If a coupling is interposed between the internal combustion engine and the electric drive device, each of these two assemblies can optionally also be driven independently of the other assembly.

According to the disclosure, the two rotary bearings used for the radial mounting of the torque transmitting element are arranged radially offset from one another. As a result, the required installation space can be minimized in the axial direction. The rotary bearings are in particular roller bearings.

The torque transmitting element can be a so-called ring gear.

The support element is preferably a component or a portion of a fixed housing of a drive assembly, such as a housing of a drive assembly, for example.

In particular, the substantially hollow cylindrical shoulder extends substantially coaxially with respect to an axis of rotation of the torque transmitting element.

The fact that the inner face of a hollow cylinder is arranged radially outwards with respect to the outer face of a cylinder means that the inner face of the hollow cylinder is substantially radially outwards, in particular in a radially outer region of the torque transmitting system, and the outer face of the cylinder is substantially radially inwards, in particular is near the axis of rotation of the torque transmitting system.

The first rotary bearing and/or the second rotary bearing are preferably designed as radial bearings, wherein a corresponding axial load-bearing capacity is not to be excluded.

In particular, a radially acting seal can be arranged radially between the outer face of the cylinder and the shoulder.

According to a further aspect of the disclosure, the two rotary bearings have substantially the same axial position in relation to a common axis of rotation.

This means that one of the rotary bearings is arranged on a smaller diameter than the other rotary bearing and the two rotary bearings are thus nested inside one another at the same axial position.

In particular, at least one of the rotary bearings is designed as a roller bearing, in particular as a tapered roller bearing.

Further alternatives for the bearing types used are deep groove ball bearings or even angular contact ball bearings, depending on the radial but in particular also the axial load on the bearing.

In particular, both rotary bearings are designed as tapered roller bearings, wherein the pressure lines of the two bearings have a gradient with the same sign in relation to the common axis of rotation.

This means that when the pressure lines are transferred to a Cartesian coordinate system, the pressure lines extend substantially parallel, for example with a negative slope. Accordingly, the axes of rotation of the tapered rollers run in this Cartesian coordinate system with a positive slope. With substantially the same configuration of the two tapered roller bearings, the axes of rotation of the individual tapered rollers can extend substantially parallel to one another at the same angular positions.

This ensures that the torque transmitting element is axially braced or positioned in relation to the support element.

According to a further advantageous embodiment, the shoulder has a projection, extending radially inwards from the hollow cylindrical shape, for axially contacting an outer ring of the first rotary bearing. In addition, the shoulder has a portion extending radially outwards from the hollow cylindrical shape for axially contacting an inner ring of the second rotary bearing.

According to a further embodiment of the torque transmitting system, one of the two elements of torque transmitting element and support element has a radially extending portion for axially contacting an outer ring of the second rotary bearing.

The element having the radially extending portion is thus not the element which forms the shoulder on which the inner ring of the second rotary bearing is arranged.

It is possible for an axially acting securing element, such as a securing ring or a nut, for example, to be arranged on the outer face of the cylinder for axially contacting an inner ring of the first rotary bearing.

When using a securing ring, a shim for adjusting the axial distance should preferably be arranged axially between the inner ring of the first rotary bearing and the securing ring.

In a further embodiment, the cylinder is configured as a further hollow cylinder and the first connection device is configured on the inner wall of this further hollow cylinder.

In particular, the first connection device is designed as a spline which is configured to be brought into engagement with a complementary external toothing and in this way to receive a torque therefrom. The first connection device is preferably arranged in substantially the same axial position as the two rotary bearings, but arranged radially inwards in relation to them.

In a structurally simple and advantageous embodiment, the torque transmitting element has a substantially radially extending web, on the first axial side of which the rotary bearings are arranged, and on the second, axially opposite axial side of which the second connection device is configured as a second toothing, wherein there is a tool run-out in the axial direction between the second toothing and the web.

In particular, the second toothing is an internal helical toothing which is arranged on a portion of the torque transmitting element that forms the axial extension of the inner face of the hollow cylinder and extends axially beyond the web.

Due to the fact that axial forces are also transferred via such a helical toothing, preferably the second rotary bearing, which is arranged radially far outward, is the bearing with the higher load-bearing capacity since said second rotary bearing is arranged closer to the helical toothing, which is also arranged radially further outward.

The cross section of the web, starting from the radially inner cylinder of the torque transmitting element, extends substantially linearly to the further hollow cylinder of the torque transmitting element. Axially between the web and the second toothing there is enough clearance due to the tool run-out that a milling cutter or even a skiving tool can run out at the axial end region facing the web without damaging the web during production of the second toothing.

The tool run-out d, measured from an end of the second toothing facing the web to the web, has the following relationship to the tooth height Zh of the second toothing: d>5 Zh.

According to a further aspect, the support element forms the substantially hollow-cylindrical shoulder. The torque transmitting element forms the outer face of the cylinder, wherein, correspondingly thereto, the inner face of the hollow cylinder is formed radially outwards.

The torque transmitting system according to the invention provides the advantage that, due to the bearing arrangement according to the invention, a sufficiently large tool run-out can be provided, which ensures cost-effective toothing production, for example by means of milling or skiving.

Furthermore, according to the disclosure, a drive unit for a drivetrain of an electrically drivable motor vehicle, in particular a hybrid motor vehicle, is provided which has a torque transmitting system according to the invention, an electric drive device and a shaft, wherein a rotor of the electric drive device is connected to the shaft in a rotationally fixed manner and the shaft is coupled to the torque transmitting element of the torque transmitting system for transmitting a torque.

The connection between the torque transmitting element and the shaft is realized via the second connection device of the torque transmitting element. When the second connection device is designed as a helical toothing, this helical toothing meshes with a gear, also designed with a helical toothing, which gear in turn is connected in a rotationally fixed manner or possibly via a further gear stage to the shaft.

The electric drive device can comprise a first electrical machine and a second electrical machine. The stated rotor of the electric drive device is thus the rotor of one of the two stated electrical machines.

The drive unit also has a clutch with which a rotor of the first electric drive device is connectable or connected to the output shaft for the purpose of torque transmission.

In addition, a drive assembly is provided, which has a drive unit according to the invention and an internal combustion engine, wherein the internal combustion engine is coupled or can be coupled in a rotationally fixed manner with the torque transmitting element.

The internal combustion engine is connected to the first connection device of the torque transmitting element with the interposition of a disconnect clutch, if necessary. For this purpose, an output coming from the internal combustion engine or an element connected to it preferably has an external spline which is brought into engagement with the first connection device designed as an internal spline.

BRIEF DESCRIPTION OF THE DRAWINGS

The embodiments described above are explained in detail below based on the relevant technical background with reference to the associated drawings, which show preferred embodiments. The disclosure is in no way restricted by the purely schematic drawings, although it should be noted that the embodiments shown in the drawings are not limited to the dimensions shown. In the drawings.

DETAILED DESCRIPTION

Figure 1:
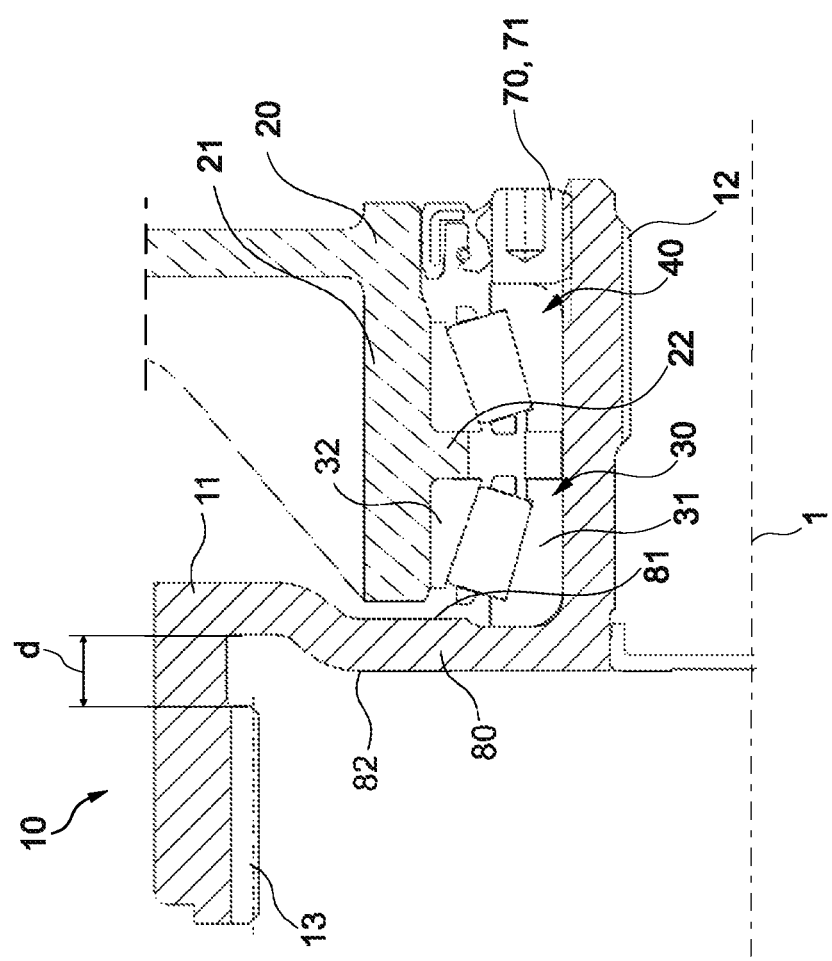
FIG. 1: shows a torque transmitting system according to the background of the art an FIG. 2: shows a torque transmitting system according to the disclosure.

FIG. 1 has already been discussed to explain the background of the art.

Figure 2:
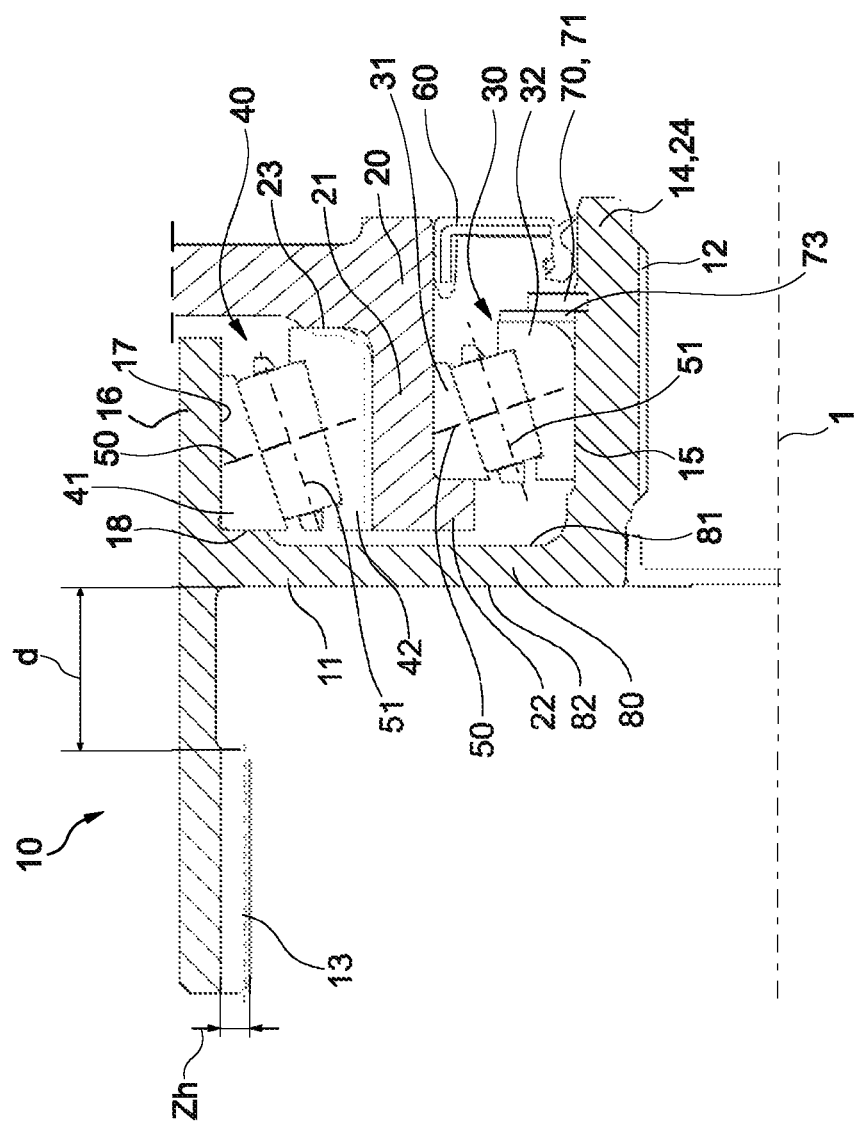

FIG. 2 shows a torque transmitting system 10 according to one embodiment.

Similar to the torque transmitting system 10 shown in FIG. 1, the torque transmitting system 10 according to the invention also comprises a torque transmitting element 11 and a support element 20, wherein the torque transmitting element 11 is designed as a ring gear and the support element 20 is a rotationally fixed component of a housing, such as a housing of a drive assembly.

In the cross section shown, the torque transmitting element 11 has a radially extending web 80, wherein the torque transmitting element 11 has a first connection device 12 on the first axial side 81 of the web 80 and a second connection device 13 on the second axial side 82 of the web 80.

The first connection device 12 is designed as an internal toothing, in particular a spline, and is used for the rotationally fixed coupling of the torque transmitting element 11 to a first assembly, such as an internal combustion engine.

The second connection device 13 is also designed as an internal toothing, in particular an internal helical toothing, and is used for the rotationally fixed coupling of the torque transmitting element 11 to a second assembly, such as an electric drive device, which can function both as an electric motor and as an electric generator.

The second connection device 13 is arranged on a radial inner face of an axial extension of a portion of a hollow cylinder 16 of the torque transmitting element 11, wherein a tool run-out d is formed axially between the second connection device 13 and the second axial side 82 of the web 80. The tool run-out d is used to create sufficient clearance for a tool during the manufacture of the second connection device 12, for example during milling or skiving. The tool run-out d, measured from an end of the second connection device 13 facing the web 80 to the web 80 itself, has the relationship d>5 Zh with respect to a tooth height Zh of the teeth of the second connection device 13.

The first connection device 12 is formed on an inner wall of a cylinder 14 of the torque transmitting element 11, which cylinder is configured as a further hollow cylinder 24.

The support element 20 is arranged on the second axial side 82 of the web 80 and forms a substantially hollow cylindrical shoulder 21.

The torque transmitting element 11 forms an outer face 15 of a cylinder 14, which in this embodiment is also realized as a further hollow cylinder 24 and, correspondingly thereto, also forms an inner face 17 of a hollow cylinder 16 radially outwards. The shoulder 21 of the support element 20 is arranged in the radial direction between the outer face 15 of the cylinder 14 and the inner face 17 of the hollow cylinder 16, wherein a first rotary bearing 30 is arranged between the outer face 15 of the cylinder 14 and the shoulder 21, and a second rotary bearing 40 is arranged between the shoulder 21 and the inner face 17 of the hollow cylinder 16.

The outer face 15 of the cylinder 14, the inner face 17 of the hollow cylinder 16 and the shoulder 21 extend substantially coaxially with respect to an axis of rotation 1 of the torque transmitting element 11.

The rotary bearings 30, 40 have a substantially identical axial position in relation to the common axis of rotation 1.

The first rotary bearing 30 rests with its outer ring 31 in the radial direction against the radial inner face of the shoulder 21 of the support element 20. In the axial direction, the first rotary bearing 30 rests against a side, facing axially away from the web 80, of a radially inwardly extending projection 22 of the shoulder 21 of the support element 20. With its inner ring 32, the first rotary bearing 30 rests in the radial direction against the radial outer face 15 of the cylinder 14 or the further hollow cylinder 24. In the axial direction, the first rotary bearing 30 rests against a shim 73. The shim 73 is axially fixed on the axial side opposite the first rotary bearing 30 by a securing element 70 designed as a securing ring 72 and is used to adjust the axial distance between the securing element 70 and the first rotary bearing 30. For this purpose, the securing ring 72 is arranged interlockingly in a circumferential groove on the radial outer face 15 of the cylinder 14 or of the further hollow cylinder 24, such that an axial position of the first rotary bearing 30 is secured.

The second rotary bearing 40 rests with its outer ring 41 in the radial direction against the radial inner face 17 of the hollow cylinder 16 and in the axial direction against a radially extending portion 18 of the torque transmitting element 11. With its inner ring 42, the second rotary bearing 40 rests in the radial direction against the radial outer face of the shoulder 21 of the support element 20 and in the axial direction against a portion 23 formed by the portion 21 of the support element 20 and extending radially outwards.

The two rotary bearings 30, 40 are designed as tapered roller bearings, wherein the pressure lines 50 of both rotary bearings 30, 40 have a gradient with the same sign in relation to the common axis of rotation 1. The pressure line 50 of the first rotary bearing 30 thus extends substantially parallel to the pressure line 50 of the second rotary bearing 40. The gradient of an axis of rotation 51 of a rotary bearing 30, 40 thus has an opposite sign in relation to the common axis of rotation 1 than the gradient of the pressure line 50. The axes of rotation 51 of the rotary bearings 30, 40 thus extend substantially parallel to one another.

This ensures an axial bracing of the torque transmitting element 11 in relation to the support element 20, such that the axial position of the torque transmitting element 11 is secured in relation to the axial position of the support element 20.

With the torque transmitting system according to the invention and the drive unit and drive assembly, a low axial installation space requirement can be achieved in a cost-effective and structurally simple manner.

LIST OF REFERENCE SIGNS

1 Axis of rotation
10 Torque transmitting system
11 Torque transmitting element
12 First connection device
13 Second connection device
14 Cylinder
15 Outer face of the cylinder
16 Hollow cylinder
17 Inner face of the hollow cylinder
18 Radially extending portion
20 Support element
21 Shoulder
22 Projection
23 Radially outwardly extending portion
24 Further hollow cylinder
30 First rotary bearing
31 Outer ring of the first rotary bearing
32 Inner ring of the first rotary bearing
40 Second rotary bearing
41 Outer ring of the second rotary bearing
42 Inner ring of the second rotary bearing
50 Pressure line
51 Axis of rotation
60 Seal
70 Securing element
71 Nut
72 Securing ring
73 Shim
80 Web
81 First axial side
82 Second axial side
d Tool run-out
Zh Tooth height

The invention claimed is:

1. A torque transmitting system for transmitting a torque from at least one drive assembly, the torque transmitting system comprising:
a torque transmitting element;
a support element which supports the torque transmitting element via rotary bearings;
the torque transmitting element has a first connection device for coupling the torque transmitting element to a first assembly in a rotationally fixed manner, and a second connection device for coupling the torque transmitting element to a second assembly in a rotationally fixed manner, wherein the first connection device and the second connection device extend parallel to an axis of rotation of the torque transmitting element;
one of the torque transmitting element or the support element forms a substantially hollow cylindrical shoulder, and the other of the torque transmitting element or the support element forms an outer face of a cylinder and, correspondingly thereto, an inner face of a hollow cylinder radially outwards;
wherein the shoulder is arranged between the outer face of the cylinder and the inner face of the hollow cylinder in a radial direction; and
a first rotary bearing is arranged between the outer face of the cylinder and the shoulder, and a second rotary bearing is arranged between the shoulder and the inner face of the hollow cylinder.

2. The torque transmitting system according to claim 1, wherein the two rotary bearings have substantially a same axial position in relation to a common axis of rotation.

3. The torque transmitting system according to claim 2, wherein the two rotary bearings comprise tapered roller bearings, and pressure lines of the two bearings have a gradient with a same sign in relation to the common axis of rotation.

4. The torque transmitting system according to claim 1, wherein the shoulder has a projection, extending radially inwards from the hollow cylindrical shape, for axially contacting an outer ring of the first rotary bearing and a portion, extending radially outwards from the hollow cylindrical shape, for axially contacting an inner ring of the second rotary bearing.

5. The torque transmitting system according to claim 1, wherein one of the torque transmitting element or the support element has a radially extending portion for axially contacting an outer ring of the second rotary bearing.

6. The torque transmitting system according to claim 1, wherein the cylinder is configured as a further hollow cylinder and the first connection device is configured on an inner wall of the further hollow cylinder.

7. The torque transmitting system according to claim 1, further comprising a substantially radially extending web, on a first axial side of which the rotary bearings are arranged, and on a second, axially opposite axial side of which the second connection device is configured as a second toothing, and a tool run-out (d) in an axial direction between the second toothing and the web.

8. The torque transmitting system according to claim 1, wherein the support element forms the substantially hollow cylindrical shoulder, and the torque transmitting element forms the outer face of the cylinder and forms the inner face of the hollow cylinder radially outwards.

9. A drive assembly comprising:
a torque transmitting system comprising:
a torque transmitting element;
a support element which supports the torque transmitting element via rotary bearings;
the torque transmitting element has a first connection device for coupling the torque transmitting element to a first assembly in a rotationally fixed manner, and a second connection device for coupling the torque transmitting element to a second assembly in a rotationally fixed manner;

one of the torque transmitting element or the support element forms a substantially hollow cylindrical shoulder, and the other of the torque transmitting element or the support element forms an outer face of a cylinder and, correspondingly thereto, an inner face of a hollow cylinder radially outwards;

wherein the shoulder is arranged between the outer face of the cylinder and the inner face of the hollow cylinder in a radial direction; and a first rotary bearing is arranged between the outer face of the cylinder and the shoulder, and a second rotary bearing is arranged between the shoulder and the inner face of the hollow cylinder;

an electric drive device and a shaft, a rotor of the electric drive device is connected to the shaft in a rotationally fixed manner and the shaft is coupled to the torque transmitting element of the torque transmitting system for transmitting a torque; and an internal combustion engine coupled or couplable in a rotationally fixed manner to the torque transmitting element.

10. A torque transmitting system for transmitting a torque from at least one drive assembly, the torque transmitting system comprising:

a torque transmitting element;

a support element which supports the torque transmitting element via rotary bearings;

the torque transmitting element includes a first internal toothing configured for connection to a first assembly in a rotationally fixed manner, and a second internal toothing configured for coupling to a second assembly in a rotationally fixed manner;

one of the torque transmitting element or the support element forms a substantially hollow cylindrical shoulder, and the other of the torque transmitting element or the support element forms a central part with an outer face and, spaced apart radially outward therefrom, a radially inwardly facing face;

the shoulder is arranged between the outer face and the radially inwardly facing face of the hollow cylinder in a radial direction; and a first rotary bearing is arranged between the outer face and the shoulder, and a second rotary bearing is arranged between the shoulder and the radially inwardly facing face.

11. The torque transmitting system according to claim 10, wherein the two rotary bearings have substantially a same axial position in relation to a common axis of rotation.

12. The torque transmitting system according to claim 10, wherein the two rotary bearings comprise tapered roller bearings, and pressure lines of the two bearings have a gradient with a same sign in relation to the common axis of rotation.

13. The torque transmitting system according to claim 10, wherein the shoulder has a projection that extends radially inwardly from the hollow cylindrical shape, for axially contacting an outer ring of the first rotary bearing and a portion, extending radially outwardly from the hollow cylindrical shape, for axially contacting an inner ring of the second rotary bearing.

14. The torque transmitting system according to claim 10, wherein one of the torque transmitting element or the support element has a radially extending portion for axially contacting an outer ring of the second rotary bearing.

15. The torque transmitting system according to claim 10, wherein the central part is configured as a hollow cylinder and the first internal toothing is located on an inner wall of the hollow cylinder.

16. The torque transmitting system according to claim 10, further comprising a substantially radially extending web, the rotary bearings are arranged on a first axial side of the web, and the second internal toothing is located on a second axial side of the web.

17. The torque transmitting system according to claim 10, wherein the support element forms the substantially hollow cylindrical shoulder, and the torque transmitting element forms the center part with the outer face and the radially inwardly facing face.

18. The torque transmitting system according to claim 10, wherein the first internal toothing extends parallel to the second internal toothing.

19. The torque transmitting system according to claim 10, wherein the first internal toothing and the second internal toothing extend parallel to an axis of rotation of the torque transmitting element.

20. The torque transmitting system according to claim 1, wherein the first connection device is a spline, and the second connection device is an internal helical toothing.

* * * * *